Patented Feb. 4, 1930

1,745,837

UNITED STATES PATENT OFFICE

GEORGE FREDRIC OLSEN, OF LOS ANGELES, CALIFORNIA

RECOVERY OF ENTRAINED OILS FROM FILTER CAKES

No Drawing.   Application filed January 22, 1927.   Serial No. 162,943.

My invention relates to the art of filtering petroleum lubricating oils in filter presses for the removal therefrom of pulverized clays or other adsorbent bodies which have previously been intermixed with such oils to decolorize or purify them, in which procedure the clay is retained on the filter cloth in the form of a layer or so-called filter-cake.

My invention relates to the recovery from such cakes of a valuable quantity of oil which is always entrained therein, by such means and in such manner as to regain the largest proportion of the oil at a minimum of cost.

My invention further relates to a manner of cooling the filter press cakes before the press is opened for the discharge of the spent clay, enabling filtration to be conducted at a higher temperature than has hitherto been feasible.

In purifying and decolorizing oils by the so-called "contact process" a suitable clay or other adsorbent body is finely pulverized and intermixed with the oil, the mixture heated to promote the reaction, and the hot mixture pumped through any of the well known types of filter press or any other suitable filtering medium, by which a separation of the spent adsorbent from the purified oil is effected. In this operation, which is well known and understood in the art, oil free from clay or other solid passes through the cloth or other porous medium with which the plates of the press are covered, while the pulverulent solids originally contained in the oil are retained on such medium in the form of a layer or cake.

As the cake increases in thickness its resistance to the passage of oil increases until it reaches the capacity of the press pump to create or of the press body to withstand the pressure. At such point the filtration is discontinued and the cake, after suitable treatment, withdrawn from the press.

At the end of the filtration step the cake necessarily retains considerable oil, up to half or more of its total weight, and as this oil is finished oil and has had expended on it all the costs and charges incident to the refining process it is too valuable to be wasted, and many attempts have been made to recover it but hitherto without any great measure of success. At this point it may be stated that the oil retained in the cake is held in two quite distinct conditions. A minor portion is held in the clay grain itself, being adsorbed and absorbed by the pores of such grain; the major portion is held in the interstices between the grains, and it is to the recovery of this interstitial or entrained oil that my invention is directed.

The most common method of recovering oil from the cake is to blow air through it until no more oil is brought to the discharge side of the filter. This method is simple and cheap but has two serious drawbacks; the first, that none of the absorbed oil and only a relatively small part of the interstitial oil are removed; the second, that such oil as is recovered in this manner is seriously depreciated in color and odor by the oxidizing effect of the air on the hot oil. The failure to remove all the entrained oil is due to the tendency of the air current to seek the path of least resistance through the cake. By the elimination of a portion of the oil the grains which compose the cake are allowed to come closer to each other, causing shrinkage of the cake in all three directions, this shrinkage opening up cracks or channels through which the air passes without resistance. A cake treated in this manner, particularly if the oil contained therein be of high viscosity, will usually be dry on the face at which the air enters and on the faces of the cracks, and wet inside the shrinkage blocks.

Another well known method is to first drain out all unfiltered oil and thereafter to force gasoline or other light petroleum distillate into the press and through the cake, this gasoline dissolving and removing some of the adsorbed oil and, theoretically, all of the entrained oil. In practice the entrained oil is not all removed, as the gasoline passing through the least dense portions of the cake effects a complete removal of the oil from such portions only, thereby setting up a severe shrinkage and opening channels through which the gasoline thereafter bypasses, so that the remaining portions of the cake are not cleansed at all. Further, if the cake be hot, as is usually the case, gasoline has a strong tendency to dissolve color bodies as well as oil from the clay grain, and on removal of the gasoline from the recovered oil these color bodies are left behind in the oil, strongly depreciating its value. Further, the press and its connections are filled with distillate having a very low flash point, and in order to protect the oil passing through the press in the next cycle the press must be thoroughly cleaned and dried after filling it with gasoline. And finally, gasoline is an expensive material and is readily volatile, so that not only are large losses of solvent incurred, but also these losses are unduly costly.

I have discovered that by using for recovering the entrained oil from the cake an oil intermediate in its properties (and its position in the crude fractionation) between gasoline and salable lubricating oil, such entrained oil may be recovered much more completely and at a materially lower cost than when gasoline or other volatile distillate is used as a solvent, and more advantageously than by simply blowing the cakes with air. At the same time a desirable cooling of the cake is accomplished, and such other useful and valuable results as will appear from the following description.

In making a complete fractionation of petroleum for the manufacture of gasoline, kerosene and lubricating oils, there is a fraction intermediate between the kerosene and the lubricating oils which has no commercial application except as a fuel oil or as a raw material for the so-called cracking processes. For either of these purposes it has a commercial value which is usually about one-third that of gasoline and from one-fourth to one-tenth that of the various grades of finished lubricating oil. It is substantially non-volatile at ordinary temperatures and not materially volatile at temperatures up to 250° or even 300° Fahr. In the crude form, as distilled from the crude petroleum, it usually has a yellow to deep red color and a strong and unpleasant odor, but may very readily be refined by the usual acid treatment, yielding a pale yellowish oil having a slight and agreeable smell which will not resemble that of kerosene if a sufficiently sharp cut has been made in the distillation. This oil may be itself fractionated, either in running the crude or by redistillation, and where this is done the lower-boiling and lighter portions will approach kerosene in their characteristics while the higher-boiling and heavier portions will have characteristics approaching those of the lighter lubricating oils, but lacking sufficient viscosity to render them salable as lubricants. Either the entire fraction above described or any of its fractions may be used in the practice of my invention, with or without a preliminary refining step, under the various alternative conditions hereinafter set forth.

The above described solvent oil is applied to the recovery of entrained oil in the very simple manner heretofore used in applying gasoline and other volatile solvents for the same purpose. The press in which the desired amount of cake has accumulated is drained of its content of lubricating oil and thereafter the solvent oil is pumped through the press and its contained cakes (preferably by a pump other than that used for feeding the oil to be filtered) until the cakes are washed free from oil and the solvent comes through unchanged. The solution of lubricating oil in solvent oil thus obtained is placed in a suitable still (of any of the well known types adapted to the distillation of petroleum products), the solvent oil distilled off and saved for use in succeeding operations of the same character, and the recovered lubricating oil left behind as a still bottom. If preferred the lubricating oil also may be distilled over, but in such case is run into a separate receptacle and not mixed with the distilled solvent oil.

The above statement might appear to infer that the solvent oil must be completely distilled off in order to obtain a residue suitable for use as a lubricating oil. This is far from the case, and in fact a directly contrary procedure is followed in my preferred method of operation, and has distinct and important advantages.

The lightest lubricating oil which is marketable for use in internal combustion engines has a viscosity of 140/150 seconds Saybolt Universal at 100° Fahr., and a flash test of about 325° F. If the lubricating oil entrained in the cake previous to the recovery operation above described has a higher viscosity and flash test than 140 seconds and 325° Fahr. a certain proportion of the solvent oil (which proportion will vary with the properties of the entrained oil) may be left behind in the still bottom without reducing the viscosity and flash test of such still bottoms below market requirements. Obviously, the more viscous the entrained oil the larger may be the proportion of solvent oil residue, and the greater the yield of residual mixed lubricant.

It should be pointed out that a mere admixture of a lubricating oil heavier than the minimum market requirement and a solvent oil will not accomplish the same purpose of materially increasing the yield of lubricant. Such admixture of a heavier oil with one of less viscosity and low flash will, unless the heavier oil be of very high viscosity, admit only a very small proportion of the solvent oil described. But on mixing the two oils (a solvent oil and a heavier lubricating oil) and submitting the mixture to a topping operation as described, the heavier portions of the solvent oil will be held back by the mass of heavier oil, so that a material portion of the solvent oil will be fractionated out as a commercial lubricating oil and retained in the still bottom mixture.

By this means I recover as a commercial lubricating oil not merely the oil entrained in the cake, but also convert into salable oil a considerable proportion of the solvent oil. As the solvent oil has originally a very low value as compared to that of even the lightest lubricating oil, the financial advantage attending this method of recovery may be very important.

It is obvious that the same conversion of non-viscous into viscous oil may be accomplished by mixing and topping oils, as above described, without first recovering the heavier oil from the filter cake, though in such case the advantage is less, as the entire cost of the topping operation must be charged against the quantity of nonviscous oil converted, whereas in recovering entrained oil as above described the cost of topping may be divided between the conversion and the recovery operation itself.

It is desirable, though not essential, to separate the first runnings from the press (in the washing operation) which are rich in recovered oil, from the after-runnings which contain less dissolved oil, using such after-runnings as a first wash in the next operation. By this means a more concentrated solution is obtained and the load on the distillation apparatus reduced. It is also desirable, though not essential, to blow the cakes with air in the usual manner at the end of the washing operation, thus recovering a considerable portion of the solvent oil which would otherwise be left entrained in the washed cake.

The advantages gained in using a solvent oil of the described character in place of a more volatile solvent are various and important. The difference in cost of the solvent is material, particularly in view of the fact that a certain amount of irrecoverable solvent (of whatever character is used) is left behind in the cake, even after air blowing. The solvent being practically non-volatile at the temperatures at which it is used, the heavy evaporation loss suffered in using volatile solvents is entirely avoided. The washing of the cake is much more completely effected than is possible where a volatile solvent is used, because of the fact that the cake does not channel in applying the heavy solvent. This appears to be due to the greater viscosity of the described solvent, the Saybolt viscosity of gasoline being about 25 seconds and of kerosene about 30 seconds, while the viscosity of the lighter fraction of the above solvent oil is 40 to 50 seconds and of the entire fraction 60 to 75 seconds. The more viscous solvent is entrained to a greater extent in the cake as it displaces and dissolves the entrained lubricating oil, and thus the shrinkage which takes place in gasoline washing is avoided and channelling and bypassing of solvent obviated. A greater quantity of the heavy solvent remains in the cake, even after airblowing, but this increase in loss is much more than balanced by saving in evaporation and reduced initial cost of the solvent material.

If the lubricating oil originally entrained in the cake is a finished oil, decolorized and purified to the condition in which it is required for use or sale, the solvent oil should preferably be a purified oil, as such oil may be distilled away from the recovered oil without leaving behind any objectionable colored or impure residue to contaminate the recovered oil. This purification is not required if the oil entrained in the cake is an unfinished or partly finished oil, as in such case the recovered residue is preferably purified in admixture with the main body of filtered oil.

Where a purified solvent oil is required it is desirable to proceed in the following manner. The crude solvent oil is freed from water by settling and treated in the usual and well known manner with from two pounds to ten pounds of 66° sulfuric acid per barrel of oil, agitating the two liquids together at atmospheric temperatures for a period of an hour or more. The tar formed by the reaction of the acid on the oil is then allowed to settle and is withdrawn, and the acid oil preferably transferred to a clean vessel. The acid oil is then neutralized by adding to it a sufficient quantity of caustic soda lye of about 2% strength and the mixture gently agitated. If any aqueous layer subsides on settling such layer is withdrawn. The oil is then washed free from lye by repeated agitation with warm water, settling and withdrawing such water after each agitation, and is finally allowed to settle until bright and clear, or blown bright by means of a blast of warm air. This is the common and well known method of purifying and bleaching petroleum oils of low viscosity and is described for purposes of illustration only, but any other known or preferred method of bleaching and deodorizing the solvent oil may be used.

In cases where the filtration of lubricating oil is conducted at a relatively low temperature, and particularly if the lubricating oil be highly viscous, it may be desirable to gently heat the solvent oil before pumping it through the cakes. If the filtration is being conducted at a relatively high temperature there will be enough stored heat in the press and cakes to maintain the fluidity of the entrained oil, and in such cases a cold solvent oil is to be preferred. It should be borne in mind that hot solvent oil is much more likely than cold oil to redissolve adsorbed coloring matter from the cake and thus depreciate the color of the recovered oil.

Where oils containing pulverized solids are filtered at a high temperature, and particularly where the press cakes are at a temperature above 350° Fahr., when the press is opened, it is often the case that the oil in the cake ignites spontaneously. This action is more likely to result if the cake has previously been blown with air, which dislodges part of the entrained oil and thereby exposes large surfaces of oxidizable oil to contact with the atmosphere. This phenomenon has the practical effect of limiting the temperature at which filtrations may be conducted to a maximum of 350° Fahr., which is often much below the most efficient temperature.

Where my invention is used for the recovery of the entrained oil in the cake, and particularly where cold solvent oil is used for washing the cake, the action of this cold oil is to withdraw sufficient heat from the cake to cool it below the ignition temperature, and it is thus rendered possible to filter at much higher temperatures than has heretofore been considered practicable, without incurring any risk of ignition of the cake.

While I have spoken repeatedly of the preparation of the solvent oil from crude petroleum it should be understood that I do not limit my invention to an oil so prepared, but that on the contrary the solvent oil may be prepared by the fractionation of any previously prepared fraction of petroleum, either raw or purified, or from petroleum or its products which have been modified or transformed by a pyrogenous reaction such as is commonly known as "cracking." Thus the intermediate fraction from the distillation of "synthetic crude" produced by cracking either crude petroleum or any of its products is particularly suited to the carrying out of my invention because of its unusually high solvent powers.

While I have referred throughout this specification to the washing of the filter cakes in the press in which they are formed I would not be understood as limiting my invention to this particular method of applying the solvent to the cake, as it is also possible to effect the same result by crushing the cakes and washing the crushed material with the solvent oil, the solution being thereafter removed from the washed clay by a second filter-pressing or by any other ordinary or preferred means for separating solids from liquids. My invention resides, not in any mechanical steps for effecting recovery of the entrained oil, but rather in its recovery by means of the application of a particularly desirable and economical solvent material not heretofore used for this purpose.

In the attached claims where reference is made to "entrained oil" the words will be understood to mean a mineral lubricating oil mechanically retained in the interstices of a mass or cake of powdered solid material which has been utilized for declorizing or otherwise purifying the oil from which the cake was derived. Where reference is made to "heavy petroleum solvent" the words will be understood to mean a petroleum product heavier and higher boiling than commercial kerosene and lighter and of lower boiling points than commercial light lubricating oil, such solvent having a viscosity at 100° F. on the Saybolt Universal viscometer of from 50 to 75 seconds and being either a crude distillate from petroleum or its products, or a similar distillate refined and purified for the removal of colored and odorous bodies and other undesired impurities.

I claim as my invention:

1. The method of recovering entrained lubricating oil from a mass of powdered solid material which comprises: displacing and dissolving the entrained oil from said mass with a petroleum solvent intermediate in gravity and viscosity between kerosene and lubricating oil of 75 seconds viscosity Saybolt Universal at 100° F.

2. The method of recovering entrained lubricating oil from a mass of powdered solid material which comprises: displacing and dissolving the entrained oil from said mass with a petroleum solvent intermediate in gravity and viscosity between kerosene and lubricating oil of 75 seconds viscosity Saybolt Universal at 100° F. and thereafter removing the solvent from the dissolved oil by the distillation of such solvent.

3. The method of recovering entrained lubricating oil from a mass of powdered solid material which comprises: displacing and dissolving the entrained oil from said mass with a petroleum solvent intermediate in gravity and viscosity between kerosene and lubricating oil of 75 seconds viscosity Saybolt Universal at 100° F. and thereafter separating the solvent from the dissolved oil by the fractional distillation of the solution.

4. The method of recovering entrained lubricating oil from a mass of powdered solid material which comprises: displacing and dissolving the entrained oil from said mass with a petroleum solvent intermediate in gravity and viscosity between kerosene and lubricating oil of 75 seconds viscosity Saybolt Universal at 100° F., distilling said solvent from the solution and utilizing the recovered solvent in a succeeding operation of like character.

5. The method of recovering entrained lubricating oil from a hot filter press cake and simultaneously cooling said cake which comprises: forcing through said cake a petroleum solvent which is substantially non-volatile at the temperature of the cake, said solvent being a petroleum cut intermediate in gravity and viscosity between kerosene and lubricating oil of 75 seconds viscosity Saybolt Universal at 100° F., said solvent being introduced at a temperature materially lower than the temperature of the cake.

6. The method of recovering entrained lubricating oil from a mass of powdered solid material which comprises: displacing and dissolving the entrained oil from said mass with a petroleum solvent intermediate in gravity and viscosity between kerosene and lubricating oil of 75 seconds viscosity Saybolt Universal at 100° F. and thereafter reducing the solution by partial distillation to the consistency of a lubricating oil.

In witness that I claim the foregoing I have hereunto subscribed my name this 14th day of January, 1927.

GEORGE FREDRIC OLSEN.